Figure 1:
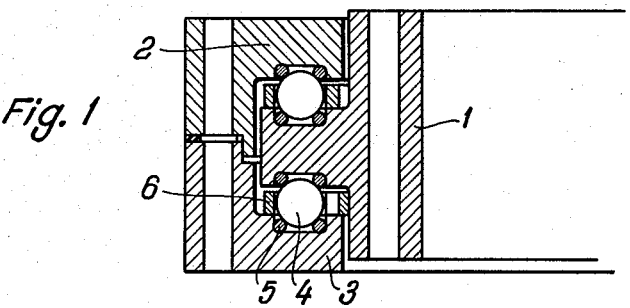

Aug. 11, 1964

H. PÖHLER ETAL 3,144,278

BEARING ASSEMBLY

Original Filed Dec. 9, 1960

2 Sheets-Sheet 1

Inventors
Heinz Pöhler
Wolfgang Schmude
by: Michael S. Striker
Atty

United States Patent Office 3,144,278
Patented Aug. 11, 1964

3,144,278
BEARING ASSEMBLY
Heinz Pöhler, Westhofen, Westphalia, and Wolfgang Schmude, Dusseldorf, Germany, assignors to Eisenwerk Rothe Erde G.m.b.H., Dortmund, Germany
Original application Dec. 9, 1960, Ser. No. 74,864. Divided and this application Nov. 10, 1961, Ser. No. 151,495
Claims priority, application Germany Dec. 12, 1959
10 Claims. (Cl. 308—15)

The present invention relates to bearings.

This application is a division of our copending application Serial No. 74,864, filed December 9, 1960, entitled "Ball Bearing and Process for Manufacturing Races Therefor."

More particularly, the present invention relates to ball bearings of extremely large diameter, on the order of one meter or more. In bearings of this type the races are not only made up of annular bodies of metal such as steel, but in addition these annular bodies carry wire rings of steel which are directly engaged by the balls of the bearings so that these balls roll on the wire rings which are carried by the annular bodies of the races.

A particular problem resides in providing bearings of this type with sufficient stiffness and rigidity as well as with the desired amount of accuracy, and also because of the large size these bearings are unusually heavy which is a further disadvantage.

It is therefore one of the primary objects of the present invention to provide a bearing of the above type which is very light in weight, particularly as compared to conventional bearings of the above type.

The lightness in the weight of the bearing of the invention is brought about by using a light metal alloy for the annular bodies of the races which carry the wire rings which are directly engaged by the ball members. Particular problems arise when dealing with such light metals. In the treatment of these light metals there are certain residual internal stresses which make it very difficult to machine such materials accurately. Furthermore when a bearing race of light metal is connected to a support of a metal such as steel or the like, particular problems arise because of the different coefficients of thermal expansion so that when the temperature changes the light metal will expand or contract to a degree greater than the steel support, and measures must be taken to compensate for these different rates of expansion and contraction resulting from temperature changes.

A further object of the present invention is to provide a light metal bearing race which will have a very great strength far beyond the strength which is conventionally expected of elements made from light metals.

An additional object of the present invention is to provide a means for connecting light metal bearing races to a support in such a way that the different rates of expansion and contraction of the light metal bearing race and the support to which it is connected can be compensated for without in any way disturbing the operation of the bearing.

In accordance with the present invention there is provided, in a bearing assembly, a light metal bearing race and a support for this race, the support having a coefficient of thermal expansion which is substantially smaller than that of the race. A connecting means connects the race to the support so that the race is carried by the support, and this connecting means of the invention connects the race to the support for limited movement with respect thereto so that during temperature changes the race can move with respect to the support to compensate for the different rates of expansion and contraction of the support and race resulting from temperature changes.

Figure 2:
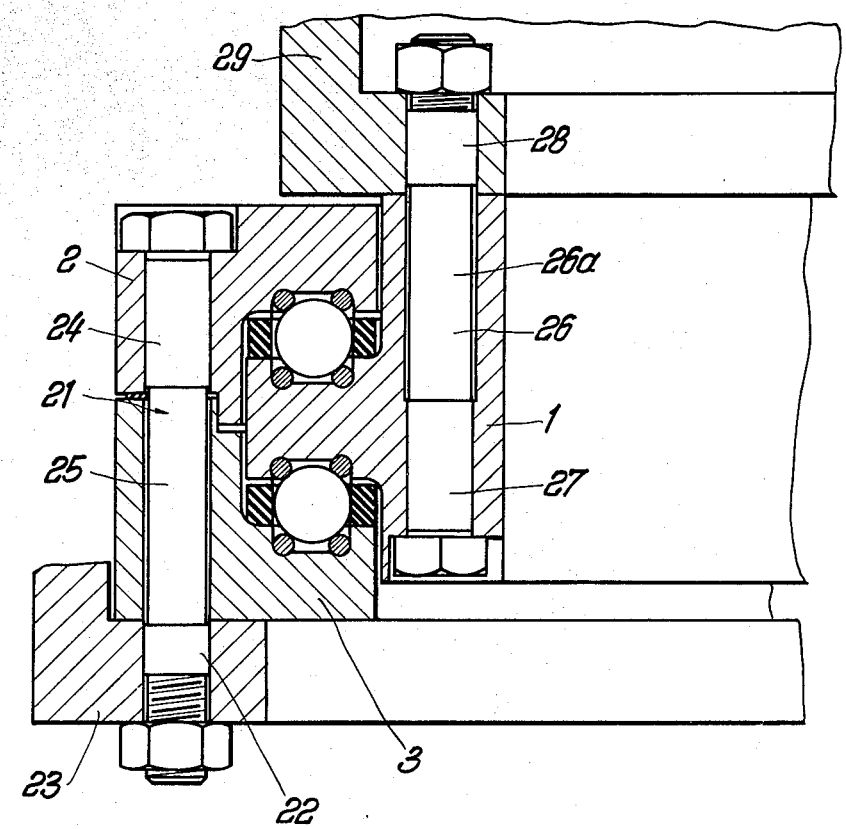
Figure 3:
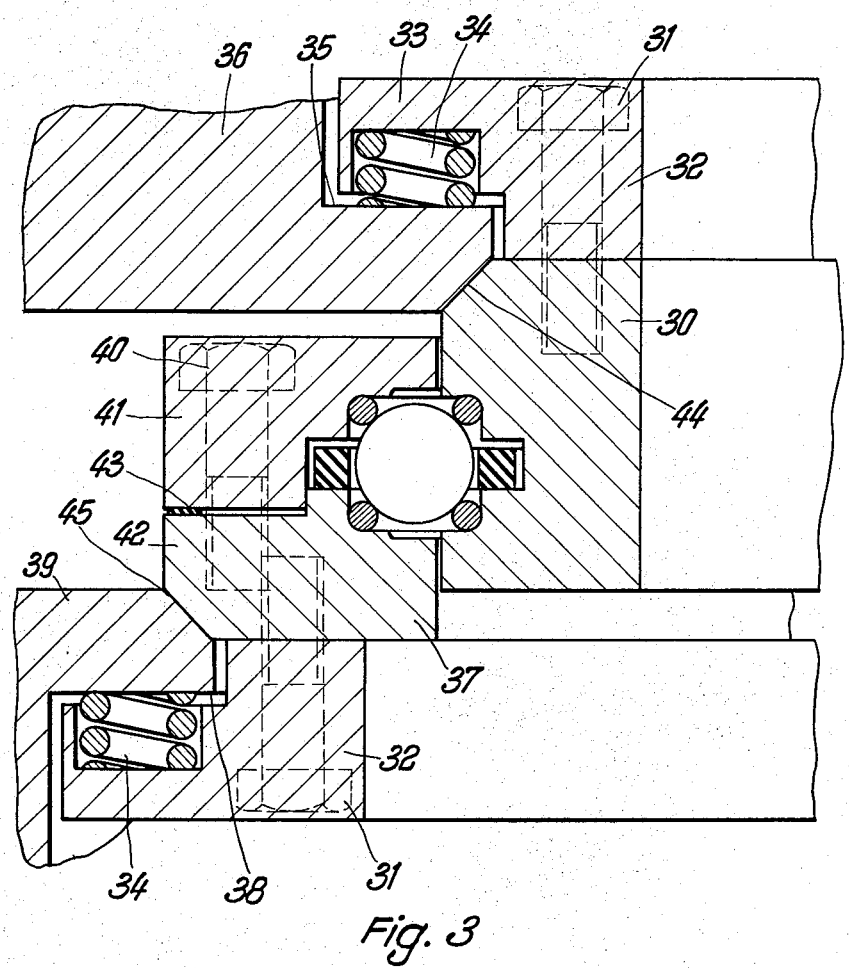

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is an axial section through one side of one embodiment of a bearing according to the present invention;

FIG. 2 is an axial section through one side of a bearing of the invention illustrating the structure of the invention for connecting the bearing to a support made of a metal different from the light metal of the bearing races; and FIG. 3 is a fragmentary axial section through one side of a bearing of the invention illustrating another embodiment of a structure for connecting the light metal bearing to a support of steel or the like.

Referring now to FIG. 1 there is illustrated therein a bearing of the invention. This bearing includes an inner ring 1 forming the inner race of the bearing. It is to be understood that while the member 1 is referred to as the inner bearing race because the member 1 is made of a light metal alloy it actually does not engage the balls 4 and carries wire rings of steel or the like for this purpose. The inner bearing race 1 is of a substantially T-shaped cross section with the leg of the T extending horizontally and the cross bar of the T extending vertically as indicated in FIG. 1 so that the race 1 includes an outer annular flange. This flange is received within the outer race means of the bearing, and this outer race means is formed by a pair of races 2 and 3, the race 2 being located over the race 3 and both of these races having an angular cross section, as indicated in FIG. 1. The particular bearing illustrated in FIG. 1 includes two series of ball members 4, and each circular row of balls 4 engages four wire rings of steel or the like which are directly carried by the races 1–3 in the manner shown in FIG. 1 where the wire rings 5 are illustrated. Such wire rings 5 are well known in the art and therefore are not further described. Each circular row of balls cooperates with a cage 6 which is also conventional and which is formed with a series of openings in which the balls 4 are respectively located, as is well known.

The bearing which is illustrated in FIG. 1 does not differ in its outer configuration and in its load-carrying capacity from conventional wire race bearings where the wire rings are carried in steel races. According to the invention the races 1–3 are made of a light metal alloy without sacrificing precision and at the same time gaining the great advantage of a great reduction in weight.

In one example of the invention the alloy is composed of aluminum, zinc, magnesium and copper, and the copper is present in the alloy in the amount of from 0.5 to 1.5%.

As has been indicated above because the bearing races of the invention are made of a light metal alloy which has a relatively high coefficient of thermal expansion, particular problems arise when mounting these races on supports of metal such as steel which have a much lower coefficient of thermal expansion. The present invention provides also a solution to the problem of mounting bearings of light metal alloy on such supports in such a way as to take care of the problem arising from the different degrees of expansion and contraction resulting from temperature changes.

Thus, referring to FIG. 2, it will be seen that the outer races 2 and 3 of the bearing of FIG. 1 are formed with aligned bores which receive the screw 21. This screw 21 extends through an aligned bore formed in a support 23 made of steel, for example. The screw 21 is provided at its lower end with a portion 22 which has a tight fit in the bore of the support 23, and the opposite end portion of the screw 21 adjacent to its head is provided with a portion 24 which has a tight fit in the bore of the race 2 which with the race 3 forms the light metal race means of the embodiment of FIGS. 1 and 2. In accordance with the present invention the screw 21 has a shank portion 25 of reduced diameter as compared to the portions 22 and 24 between which the shank portion 25 extends, and as a result the screw 21 extends with substantial clearance through the bore of the race 3 which is aligned with the bore of the support 23. Thus, this screw 21 together with the portions of the support 23 and race means 2, 3 provided with the aligned bores through which the screw 21 extends forms a connecting means which connects the race means to the support 23, and this connecting means enables the race means to have a limited degree of movement with respect to the support 23 to compensate for different rates of expanison and contraction resulting from temperature changes. When there is an increase in temperature the bearing will of course tend to expand to a degree greater than the support 23, and because of the portions 22 and 24 of the screw 21 which have a tight fit the expansion of the bearing with respect to the support will result in a slight bending or curving of the shank portion 25 so that this shank portion 25 will have a substantially S-shaped configuration. It is easily possible for the screw 21 to assume this curvature inasmuch as the shank portion 25 is relatively long. Of course, there are several screws 21 distributed about the common axis of the bearing and its support, with the result that when the temperature again falls the screws will resiliently move back to their original straight condition and in so doing will center the bearing with respect to the support, so that in this way the structure of FIG. 2 guarantees that the bearing will at all times remain precisely centered. Of course, the screws 21 are uniformly distributed about the axis of the bearing so as to have this centering effect.

The inner race 1 is connected to the support 29 in the same way that the outer race means 2, 3 is connected to the support 23. Thus, the race 1 is formed with an axial bore aligned with a bore of the inner flange of the support 29, and the screw 26 has portions 27 and 28 which have a tight fit in the bores of the race 1 and the support 29. Between its tight-fitting portions 27 and 28 the screw 26 has a shank 26a of reduced diameter to provide the clearance shown in FIG. 2, and this clearance will enable shifting of the race 1 with respect to the support 29 to compensate for different rates of expansion and contraction resulting from temperature changes in the same way as described above in connection with the screw 21. Thus, the shank 26a will assume a substantially S-shaped configuration resulting from expansion due to a temperature increase, and inasmuch as a plurality of the screws 26 are uniformly distributed about the axis of the bearing these screws 26 will have also a centering influence when the temperature drops.

The bearing shown in FIG. 3 includes only one series of ball members although the supporting arrangement of FIG. 3 may be used equally well with a bearing having two series of ball members. The steel support members 36 and 39 are provided to carry the bearing structure of FIG. 3. The support 36 has a flange which is provided with a frustoconical surface 44 while the support 39 has a flange provided with the frustoconical surface 45. The bearing of FIG. 3 includes the light metal alloy rings 37 and 41 which together form the outer race means of the bearing, it being understood that the bearing includes the circular wire members which are directly engaged by the ball members and which are carried by the light metal alloy race members. A screw 40 is shown in FIG. 3 holding the outer race rings 41 and 42 together and of course a plurality of such screws 40 are provided and are uniformly distributed about the axis of the bearing so as to form a single assembly from the outer light metal alloy rings 41 and 42, and in this way the outer bearing race means 37 is formed. An annular shim 43 whose thickness may be selected in a well known manner is provided between the rings 41 and 42 so as to very accurately determine the cooperation of the races 41 and 42 with the ball members. The bearing also includes the inner race 30 made of light metal alloy, and it will be noted that the inner race 30 has an outer frustoconical surface of the same conicity as and engaging the frustoconical surface 44 of the support 36 in the manner indicated in FIG. 3. In the same way the ring 42 has an outer beveled periphery of the same conicity as and engaging the frustoconical surface 45 of the support 39. These engaging frustoconical surfaces function as part of the connecting means for connecting the light metal alloy bearing to the support structure which is made of a metal having a coefficient of expansion substantially smaller than that of the light metal used for the bearing races.

In accordance with the invention a pair of rings 32 are respectively fixed by the screws 31 to the rings 42 and 30, and it will be seen that each of the rings 32, which are also made of light metal alloy, has an outer flange overlapping the face of the flange of the support 36 or 39 which is directed away from the frustoconical surface 44 or 45 thereof, respectively. Thus, it will be seen that the flange 33 of the upper ring 32 of FIG. 3 overlaps the face 35 of the flange of the support 36, this face 35 being directed away from the frustoconical surface 44, while the outer flange of the lower ring 32 overlaps the face 38 of the flange of the support 39, and this latter face 38 is directed away from the frustoconical surface 45. While the faces 35 and 38 are overlapped by the flanges of the rings 32, these flanges are nevertheless spaced from the faces 35 and 38, respectively, and at the faces which are directed toward the faces 35 and 38 the flanges of the rings 32 are respectively formed with recesses which receive the coil springs 34 which are under compression, and these coil springs respectively press against the faces 35 and 38. Thus, the coil springs 34 act as a spring means urging the pairs of frustoconical surfaces together, and in this way the spring means together with the flanges of the supports and rings 32 as well as together with the frustoconical surfaces form a connecting means connecting the bearing of FIG. 3 to the support for limited movement with respect thereto to compensate for different rates of expansion and contraction resulting from temperature changes. It will be noted that during contraction and expansion resulting from temperature changes a slight degree of axial movement of the bearing will take place with respect to the support, and the springs 34 serve to yield in order to compensate for this slight axial movement.

When the bearing structure of FIG. 3 becomes heated the light metal alloy rings will expand at approximately twice the rate of the steel rings and thus the rings 30 and 42 will respectively slide along the surfaces 44 and 45. This sliding takes place by overcoming the friction resulting from the compression of the springs 34 as well as from the effective weight of the bearing itself. Assuming that one of the support rings such as the ring 39 is fixed to the frame of the machine then the ring 36 will shift axially during "breathing" of the frustoconical surfaces so as to compensate for axial and radial expansion of the light metal alloy bearing. Inasmuch as the expansion is extremely small in relation to the diameter of the frustoconical surfaces, there is no danger that the bearing will tilt between the steel support rings. The pairs of cooperating frustoconical surfaces always lie flush one against the other and the inclination of the frustoconical surfaces is not self-locking so that when the bearing cools the return of the parts by the springs 34 is assured.

The light metal alloy for the ring to be taken consists of an alloy with the following alloy ingredients in percent: 2.5–5% copper, 0.2–1.8% magnesium, 0.3–1.5% Mangan, rest aluminium. These alloys are naturally aging. Particularly, an alloy with the following ingredients in percent is to be taken: 3.8–5.2% zinc, 2.4–3.8% magnesium, 0.5–1.5% copper, rest aluminium. This alloy is aging artificially.

It will be understood that each of the elements described above, or two or more together, may also find a useful application in other types of bearings differing from the types described above.

While the invention has been illustrated and described as embodied in light metal bearings, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a bearing assembly, in combination, a light metal alloy bearing race; a support for said race, said support having a coefficient of thermal expansion substantially smaller than that of said race; and connecting means connecting said race to said support so that said race is carried by said support, said connecting means connecting said race to said support for limited movement with respect to said support so that during temperature changes said race can move with respect to said support to compensate for the different rates of expansion and contraction of said support and race resulting from temperature changes, said connecting means including a resiliently deformable portion and being arranged in such a manner that, when said race moves relative to said support under the influence of temperature changes, said portion is resiliently deformed so as to exert a resilient force tending to maintain the relative position of race and support during any temperature change.

2. In a bearing assembly, in combination, light metal alloy bearing race means; support means for said race means, said support means having a coefficient of thermal expansion substantially less than that of said race means, and said support means and race means contacting each other and having their contacting portions formed with aligned bores communicating with each other; and a screw extending through said aligned bores for connecting said race means to said support means, said screw having at one end portion a tight fit in said bore of said support means and at an opposite end portion a tight fit in said bore of said race means, and said screw having an elongated shank portion of reduced diameter between said end portions so that said shank has a substantial clearance in said bore of said race means permitting resilient bending of said screw along its shank portion of reduced diameter during shifting of said race means with respect to said support means resulting from temperature changes.

3. In a bearing assembly, in combination, a light metal alloy bearing race; a support for said race, said support having a coefficient of thermal expansion substantially smaller than that of said race; and connecting means connecting said race to said support so that said race is carried by said support, said connecting means connecting said race to said support for limited movement with respect to said support so that during temperature changes said race can move with respect to said support to compensate for the different rates of expansion and contraction of said support and race resulting from temperature changes, said connecting means including a pair of frustoconical surfaces of said race and support engaging each other and having the same conicity so that said frustoconical surfaces can slide one with respect to the other and said connecting means connecting said race and support to each other for limited axial movement one with respect to the other, and said connecting means including a spring means urging said frustoconical surfaces toward each other.

4. In a bearing assembly, in combination, a support having a flange formed with a frustoconical surface; light metal alloy bearing race means formed with an annular cutout receiving said flange, said race means having a frustoconical surface of the same conicity as said frustoconical surface of said support engaging said frustoconical surface of said support and said support having a face directed away from its frustoconical surface, said race means having a flange overlapping and spaced from said face of said support and provided with a face directed toward said face of said support, at least one of said faces being formed with a recess; and spring means located between said faces and extending into said recess for urging said frustoconical surfaces toward each other, said support having a coefficient of thermal expansion substantially smaller than that of said race means so that the latter can shift at its frustoconical surface with respect to said support while having a slight degree of axial movement with respect thereto.

5. In a bearing assembly, in combination, a support having a flange formed with a frustoconical surface; light metal alloy bearing race means formed with an annular cutout receiving said flange, said race means having a frustoconical surface of the same conicity as said frustoconical surface of said support engaging said frustoconical surface of said support and said support having a face directed away from its frustoconical surface, said race means having a flange overlapping and spaced from said face of said support and provided with a face directed toward said face of said support, at least one of said faces being formed with a recess; and spring means located between said faces and extending into said recess for urging said frustoconcial surfaces toward each other, said support having a coefficient of thermal expansion substantially smaller than that of said race means so that the latter can shift at its frustoconical surface with respect to said support while having a slight degree of axial movement with respect thereto, said race means including a pair of rings one of which is provided with the frustoconical surface of said race means and the other of which has the flange of said race means, and fastening members interconnecting said rings of said race means.

6. In a bearing assembly, in combination, a race ring; an annular support for said race ring coaxially arranged therewith and having a coefficient of thermal expansion substantially smaller than that of said race ring; and connecting means connecting said race ring to said annular support so that said race ring is carried by said support for limited movement with respect thereto so that during temperature changes said race ring can move with respect to said support to compensate for the different rates of expansion and contraction of said support and race ring resulting from temperature changes, said connecting means engaging said race ring at portions thereof distributed about the axis thereof and said connecting means including a resiliently deformable portion and being arranged in such a manner that, when said race ring moves relative to said support under the influence of temperature changes so as to exert a resilient force tending to maintain the coaxial relationship of said race ring and support during any temperature changes.

7. In a bearing assembly, in combination, bearing race means; support means for said bearing race means, said support means having a coefficient of thermal expansion substantially less than that of said bearing race means; and connecting means connecting said bearing race means to said support means for limited movement with respect thereto and so that during temperature changes said bearing race means can move with respect to said support means to compensate for the different rates of expansion and contraction of said support means and said bearing race means resulting from temperature changes, said connecting means including an elongated member having a pair of end portions fixedly and immovably connected to said support means and said bearing race means, respectively, and having intermediate said end portions an elongated resiliently deformable portion integral with said end portions and radially spaced from said bearing race means and support means and being deformed during different rates of thermal expansion and contraction of said support means and said race means so as to exert onto the latter radial forces tending to maintain the relative position of race means and support means during any temperature change.

8. In a bearing assembly, in combination, bearing race means; support means for said bearing race means, said support means having a coefficient of thermal expansion substantially less than that of said bearing race means, said support means and said race means being formed with aligned bores extending in axial direction of said race means; and connecting means connecting said bearing race means to said support means so that said bearing race means is carried by said support means for limited movement with respect thereto and so that during temperature changes said bearing race means can move with respect to said support means to compensate for the different rates of expansion and contraction of said support means and said bearing race means resulting from temperature changes, said connecting means including an elongated rod-shaped member having a pair of end portions respectively tightly fitted into said bores of said support means and said race means and having intermediate said end portions an elongated resiliently deformable portion integral with said end portions and radially spaced from said bearing race means and support means and being deformed during different rates of thermal expansion and contraction of said support means and said race means so as to exert onto the latter radial forces tending to maintain the relative position of race means and support means during any temperature change.

9. In a bearing assembly, in combination, a bearing race; and support means having a coefficient of thermal expansion substantially smaller than that of said race, said support means supporting said race immovably in axial direction while permitting limited movement of said race in radial direction relative to said support means so that during temperature changes said race can move with respect to said support means to compensate for the different rates of expansion and contraction of said support means and race resulting from temperature changes, said support means including biasing means which are stressed during different expansion and contraction of race and support means so as to exert radial forces on said race tending to maintain the relative position of race and support means during any temperature change.

10. A bearing assembly as set forth in claim 9 in which said bearing race is made from light metal alloy.

References Cited in the file of this patent

UNITED STATES PATENTS

| 2,724,621 | Kenney | Nov. 22, 1955 |
| 2,785,934 | Alderstam et al. | Mar. 19, 1957 |
| 3,002,429 | Franke et al. | Oct. 3, 1961 |

FOREIGN PATENTS

| 560,923 | France | July 23, 1923 |
| 1,041,307 | Germany | Oct. 16, 1958 |